United States Patent [19]
Guerrieri

[11] 3,914,352
[45] Oct. 21, 1975

[54] BUBBLE CAP TRAY
[75] Inventor: Salvatore A. Guerrieri, Newark, Del.
[73] Assignee: University of Delaware, Newark, Del.
[22] Filed: Dec. 26, 1973
[21] Appl. No.: 427,481

[52] U.S. Cl. .......................................... 261/114 TC
[51] Int. Cl.² ............................................ B01D 3/20
[58] Field of Search ..... 261/114 R, 114 A, 114 VT; 137/512.1, 533.17

[56] References Cited
UNITED STATES PATENTS

| | | | |
|---|---|---|---|
| 1,620,751 | 3/1927 | Bartlett | 261/114 A |
| 1,882,104 | 10/1932 | Wallis | 261/114 R |
| 2,247,485 | 7/1941 | Edmister et al. | 261/114 R |
| 2,522,425 | 9/1950 | Baumann et al. | 261/114 A |
| 2,658,738 | 11/1953 | Plossl et al. | 261/114 A |
| 2,690,332 | 9/1954 | Jorgensen | 261/114 R |
| 2,855,187 | 10/1958 | Rector | 261/114 R |
| 2,917,293 | 12/1959 | Mendelsohn et al. | 261/114 R |
| 3,293,149 | 12/1966 | Lengemann et al. | 261/114 VT X |

Primary Examiner—Frank W. Lutter
Assistant Examiner—William Cuchlinshi, Jr.

[57] ABSTRACT

This invention relates to an improved bubble cap tray for use in towers employed in liquid-vapor contacting service such as distillation, absorption, and similar operations. The tray is an assembly of troughs of two different widths, each trough having a cross section shaped approximately like a block U. The wide ones form the tray floor and chimneys. They are spaced from each other with the legs of the troughs pointing upward having the space between two adjacent troughs closed at each end by a spacer piece whereby the combination of the legs of two adjacent troughs and the two end spacers form a long, low, narrow chimney. The narrow troughs, whose ends are closed by end pieces, are the caps which are placed over the chimneys, with the legs of the troughs pointing down, the resulting assembly thus providing a continuous vapor passage connecting the space below said assembly with the space above it. The assembly of tray and cap troughs is supported in the usual manner upon structural members fastened to the walls of the tower.

5 Claims, 7 Drawing Figures

DETAIL OF INTERMEDIATE SUPPORTS

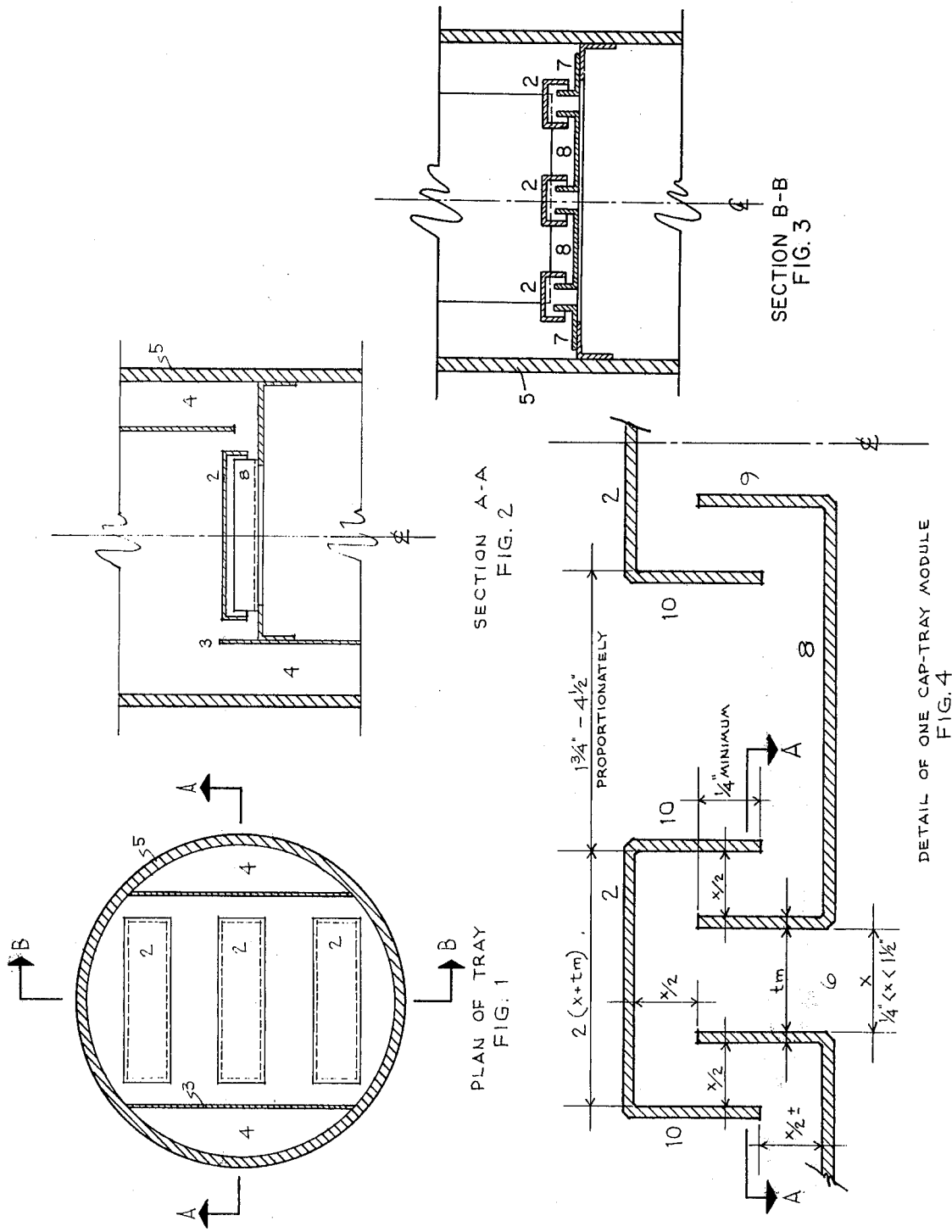

DETAIL OF WELDED END CLOSURE

DETAIL OF BOLTED END CLOSURE

DETAIL OF INTERMEDIATE SUPPORTS

BUBBLE CAP TRAY

BACKGROUND

1. Field of the Invention

The present invention is directed to an improvement in towers in distillation service or in other applications which require intimate vapor-liquid contact, particularly to an improved design of a bubble tray.

2. Description of the Prior Art

A vapor-liquid contactor, such as a distillation tower, has a plurality of trays spaced one above the other within an enclosure usually formed by the wall of a vertical cylindrical shell, closed at top and bottom, having inlet and outlet connections, etc., attached at locations according to the needs of the process conducted therein as is well known by those who are familiar with the art. Gases and vapors flow upward through a tray while a liquid flows across the tray from the outlet of the downcomer from the tray above to the inlet of the downcomer leading to the tray below. The gas or vapor rising through the tray, bubbles through the liquid passing over the tray and thereby provides a large turbulent vapor-liquid interface across which mass and heat transfer can take place.

The most widely used vapor-liquid contacting device has been the bubble cap tray. These trays are constructed of metal plates which are fastened to suitable vertically spaced supports firmly attached to the tower. The plates are pierced with holes, and short tubes are fitted into these holes to serve as chimneys for conveying the gases and vapors through the trays. Caps are placed over the chimneys to divert the vapor stream downward and into the liquid flowing across the trays. In order to break up the vapor stream into small bubbles, the caps are provided with slots uniformly spaced along the periphery. Thus vapor from a tray would pass upwardly through the chimneys of the tray above it, then reverse its direction and flow down through the annular spaces between the caps and chimneys, then through the slots along the caps' periphery and bubble into the liquid. As just described both the chimneys and caps are round, but to improve performance, almost every other conceivable cap shape has been advocated or tried. These shapes include hexagonal caps and relatively long narrow caps, generally rectangular in shape. It is general practice to provide slots as described above for all caps whatever their shape. The most popular round caps range between four and eight inches in diameter although both larger and smaller caps have been used. These are usually, but not always, arranged on the trays in an equilateral triangular pattern and the clearance between caps is usually about one quarter of the cap diameter. Caps are usually installed with the bottom edge between one-half inch and two inches above the tray floor.

Although the long rectangular caps did not gain the popularity of the round caps, they performed better. The improvement was due to the more uniform distribution of vapor over the whole tray because the liquid gradient across the tray with these caps was lower than with round caps. The improved vapor-liquid contact thus obtained resulted in higher tray efficiencies.

Before World War II, trays (and caps) were either cast (such as cast iron) or fabricated from thin plates and tubing (such as steel), but later fabricated trays became the general practice because of lower cost. Cost has been further reduced and performance improved by the development of other tray designs. These include sieve trays and a number of valve trays. Sieve trays are constructed from perforated metal plates having holes ranging between ⅛ and ½ inch diameter supported on structural members attached to the tower shell. Valve trays are essentially sieve trays with larger holes covered by guided plates that can move up or down with vapor rate thus modifying the area of the vapor passage with vapor rate.

Performance of sieve trays has usually been compared with bubble cap trays fitted with round caps. Generally such comparisons have indicated sieve trays to have higher capacity and efficiency than bubble cap trays.

Although the principal recent development effort has been on the sieve tray and its variations, improvements in bubble cap trays have also been attempted because a bubble cap tray can operate satisfactorily over a much wider range of flow rates than a sieve tray. Ways have been sought to design a lightweight bubble cap tray that could compete with the sieve tray in cost and performance. Examples of these developments are the Bowles tray, U.S. Pat. Nos. 2,692,128 and 2,699,929 and the Jorgensen tray, U.S. Pat. No. 2,690,332. Both of these trays are similar in that they both use long caps, but they differ in their construction and mode of operation. A much earlier tray which also used a long cap is represented by the Wallis tray, U.S. Pat. No. 1,882,104.

Neither the Wallis nor the Bowles construction has seen significant industrial use. The Jorgenson tray appears to follow closely the old cast iron tray citeria with the same advantages and weaknesses. His patent teaches how to fabricate out of sheet metal a tray assembly resembling the former cast metal trays, but does not give important criteria such as dimensions of the caps, chimneys, cap spacing and the like.

Sieve trays are seriously handicapped because of poor performance at operating rates moderately lower than design. Valve trays overcome this difficulty to some extent but are more complicated and more costly than sieve trays. The customary round bubble cap tray which can give good performance at lower than design rates cannot compete with sieve trays because of higher cost and poorer performance.

OBJECTIVE OF THIS INVENTION

An objective of this invention is to provide an improved bubble cap tray. Another objective is to reduce the cost of fabrication of bubble cap trays.

These objectives and others will become apparent from the following disclosure with reference to the accompanying drawing.

SUMMARY OF THE INVENTION

The complete tray according to this invention includes an assembly of U-shaped flat bottomed troughs of two different widths, the wide ones forming the tray floor and chimneys, the narrow ones, the caps, said assembly being installed in vertically spaced relationship within a vapor-liquid contacting tower by methods and means known to those familiar with the art.

The wide troughs are spaced parallel to each other a small distance apart with the legs of the trough pointing upward and with the ends of the spaces between the troughs closed by end pieces attached to the legs of the trough, whereby the combination of two adjacent legs and related end pieces form a long, low, narrow chimney. The tops of these end pieces project above the tops of the legs of the trough whereas the bottoms of said pieces are in the plane of the bottoms of the troughs. In addition to the end spacers, intermediate spacers are provided as required for strength and rigidity. This assembly of troughs is supported in the usual way by structural members attached to the shell of the tower, and is placed in the tower with the long axis of the troughs parallel to the liquid stream. The distance between adjacent troughs, depending upon the design operating conditions within the tower, ranges between a fourth of an inch and one and one-half inches, the widths of the troughs vary proportionately between two and six inches, and the height of the legs of the troughs likewise vary between three-fourths of an inch and two inches.

The narrow troughs with ends closed by end pieces are placed over the chimneys with the legs of the trough pointing down and are supported by the forementioned tray trough end pieces and intermediate spacers when included. The bottom edge of the cap is located only high enough above the floor of the tray to make a long, narrow opening or slot between the tray floor and the edge of the cap. The height of the slot, and hence the area of the opening is determined for each case by the vapor and liquid flow rates. In all cases, however, the bottom edge of the cap is lower than the top edge of the chimney in order to provide a liquid seal which prevents the passage of liquid from said tray to the tray below through said assembly.

DESCRIPTION OF THE DRAWING

Reference is made to the two drawings comprising seven emblematic figures where like reference numerals denote like parts.

FIG. 1 is a plan view of a tray, showing the caps 2, overflow weir 3, downcomer 4 to the tray below enclosed by the downward extension of overflow weir 3 and a portion of the shell of tower 5.

FIG. 2 is a sectional elevation of a portion of tower 5 taken on line AA in FIG. 1. The two new elements shown in this view are cross sections of downcomers 4, and of cap 2.

FIG. 3 is a sectional elevation of a tray taken on line BB in FIG. 1 and shows the general arrangements of the caps 2 and tray troughs 7 and 8. Tray trough 7 differs from tray trough 8 in that, effectively, it is half of a trough with the remaining space closed by a support plate fitted to the tower wall.

FIG. 4 is an enlarged cross-sectional view of a module of a tray assembly of FIG. 3 to illustrate the relative dimensions of the members to produce a satisfactory tray.

PREFERRED EMBODIMENT

Figure 5:
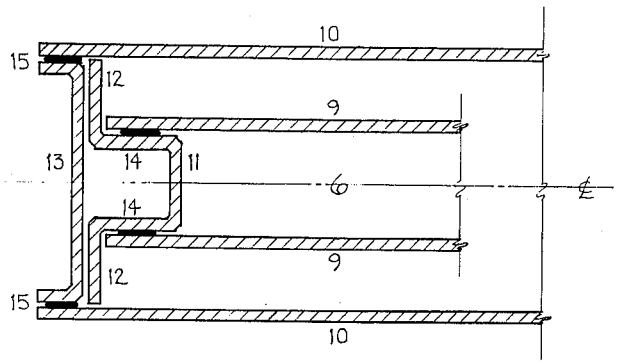
FIG. 5 presents a horizontal cross section of a module of the assembly taken on line AA of FIG. 4 at one end of the assembly to show one way to close the ends of the cap troughs and chimneys. The figure includes the upwardly extending tray trough legs 9, the downwardly extending cap legs 10, the chimney end closure 11, the lateral extension of the chimney closures legs 12 which serve to center the cap over the chimney 6, and the cap closure 13. The distance between the ends of the lateral extension of the chimney closure legs 12 is slideably equal to the inside width of the cap. As used herein and elsewhere in this patent application, "slideably equal" means that the parts must fit closely together but not so close as to cause jamming. The parts comprising the assembly are fastened together by welds 14 and 15. Obviously, bolted construction may be used, if desired.
Figure 6:
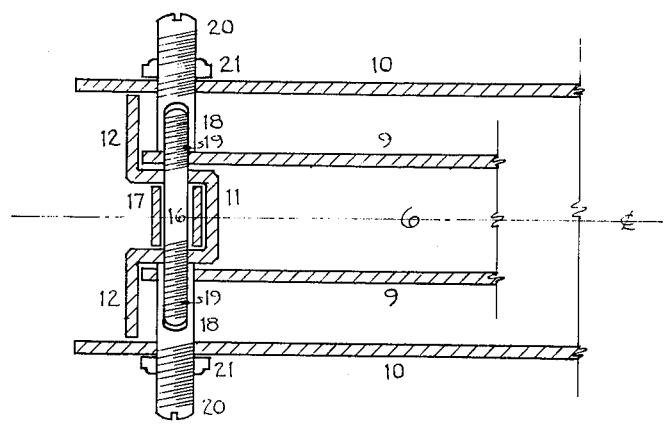
FIG. 6 presents a view similar to FIG. 5 but shows a somewhat different method for closing the troughs' open ends. In this case, the lateral extensions of chimney end closure legs 12 center the cap over the chimney and also close the ends of the cap troughs. The parts may be fastened by welding, but in this case, bolted construction as shown is preferred. Stud bolt 16 is slightly shorter than the inside width of the cap. A spacer 17 (essentially a relatively thick washer) fits around bolt 16 between the legs of closure 11. Its purpose is to prevent twisting the leg members of the assembly when nuts are drawn up tight against them, and it may be omitted when the tray and cap members are inherently strong enough to withstand such stresses. End closure 11 is fastened to tray trough legs 9 by means of cap nuts 18 bearing firmly on tray trough legs 9. Cap nuts 18 include external threads 20 as well as internal threads 19. The external threads 20 are engaged by nuts 21 to compress cap legs 10 firmly against lateral extensions 12 to close the ends of the caps.
Figure 7:
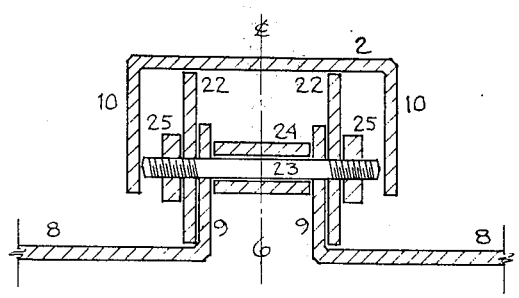
FIG. 7 presents a cross section similar to FIG. 4 but taken through the center of an intermediate spacer/support. This figure shows a stud bolt 23, a spacer 24 centered on said stud bolt, said spacer's length being equal to the width of the chimney, cap supports 22 having a height equal to the inside height of the cap above the tray floor, and with one edge resting on the floor of tray channel 8, opposite edge contacting cap trough 2, each said support having a hole matching the bolt hole in the adjacent channel trough legs 9 through which stud bolt 23 is inserted, and nuts 25 to fasten said assembly. Stud bolt 23 is slightly shorter than the inside width of the cap and serves to center the cap over the chimney.

The tray assembly requires no unusual or novel means of support or attachment to the tower shell. Standard practice may be followed, and therefore these parts need not be elaborated here.

The troughs comprising the tray floor and caps, and the spacers are preferably formed by a simple process, such as rolling, drawing, stamping and cutting. Mass production methods are possible to minimize cost because only relatively few simple standard shapes are needed to construct the trays. The metal thickness of the parts may vary with each application because this dimension depends upon a number of factors which are sure to vary with each application. Such dimensions make allowance for corrosion, unsupported length of troughs, permissible deflection under load, and the like. Most important are the dimensions based upon performance considerations. These are the distance between adjacent caps in FIG. 4 and the dimensions represented by the symbol $x$, the inside width of the chimney. All other dimensions of the vapor passage are related to $x$. Although there can be almost any number of relative areas for these various regions, all of these areas should be alike for reasons of simplicity and economy. The symbolic dimensions shown in FIG. 4 are in accordance with this principle. The dimension, $x$, can be varied fairly widely. For mechanical as well as for economical reasons $x$ should preferably not be less than one-quarter inch, and for performance reasons, usually not more than 1½ inches. The latter limit is related to the distance between the faces of adjacent caps and the effect this distance has upon contact efficiency. To get good vapor-liquid contact, the maximum distance betwen cap faces is preferably under four inches; the minimum distance should not be so small that jetting is encountered at maximum vapor flow rates. Normally the minimum distance is preferably not less than about 2 inches. The total area of the exit slots is usually the same as the other areas, but in certain applications it may be preferable to make this area more or less than the chimney area. For this reason, the height of the slot is indicated as $(x/2 \pm)$ in FIG. 4.

A critical and important dimension is the distance between the top edge of the chimney and the bottom edge of the cap. This is the seal provided to prevent loss of tray liquid by leakage through the caps and chimneys unto the tray below. Normally, a one-fourth inch seal is adequate for a tray constructed in accordance with the criteria of this invention but the seal should be increased if an examination of the tray fluid dynamics indicates that a greater seal is needed to prevent passage of liquid through the tray.

It is obvious from the above discussion that the fluid dynamics of this tray and of the sieve tray are quite similar, except in reference to the means for keeping the liquid on the tray. Since the vapor opening into the liquid is a narrow slot at the tray floor the quality of the vapor dispersion of this tray is quite similar to the sieve tray and much superior to the usual bubble cap tray where the liquid static head on a slot varies with vapor and liquid rate, its orientation on the cap, and with the location of the cap upon the tray. Unlike the sieve trays, however, liquid leakage through the tray is completely avoided in this construction at all practical vapor rates and with low or moderate pressure drop through the tray. This tray is therefore a significant improvement over the sieve tray. The designer has much more flexibility and freedom in setting the area for the vapor passage than he has in the case of the sieve tray. Keeping the liquid on a tray in this design is no longer strongly dependent upon high hole velocities, and therefore high pressure drops through the vapor passages. Generally the pressure drop through the tray of this invention is less than through a sieve tray. This feature is of great importance in the case of vacuum towers because in the case of the sieve tray the designer is constrained between allowable pressure drop and the necessity of keeping the liquid on the tray. This constraint imposes narrow operating limits on sieve trays in vacuum service. Such limitations do not occur in the tray construction presented here.

The tray of this invention, having low narrow caps and relatively wide spaces between cap faces whereby the liquid flows between and over the caps, offers substantially the same frictional resistance as the sieve tray to the flow of liquid across the tray, and like the sieve tray, the liquid gradient is small indeed. Because of this feature, uniform distribution of vapor over the whole tray is easily obtained, resulting in optimum vapor-liquid contact.

Finally, the use of low, narrow caps and other features of this invention minimizes the amount of metal needed to construct the trays and the relatively few simple shapes used in the assembly minimizes fabrication and erection costs.

EXAMPLE

A model of this tray was tested with an air-water system and its operation was compared with that of a sieve tray placed below it in the same apparatus. The test apparatus had plexiglass walls to provide visual observation of the tray action in addition to measured observations such as clear liquid height and froth heights taken at intervals from the inlet downcomer to the outlet downcomer. Particular attention was paid to liquid leakage through the tray and to vapor pressure drop.

The simulator was rectangular in section, having an inside width of nine inches and an inside length of 51 inches, which included space occupied by downcomers. There were three 30 inch long bubble caps on the tray having the dimension $x$ equal to three-eights of an inch and other dimensions in the proportions shown in FIG. 4. The height of the outlet slot was three sixteenths of an inch. On cap was centered on the long axis of tray; the centers of the other two caps were placed parallel to it three inches away, thus providing two inches between faces of adjacent caps and one inch (or one-half of the cap spacing) between the wall of the vessel and the cap near the wall.

The sieve tray had one-quarter inch holes on three-quarter inch triangular centers over a 30 inch length. Enough holes were blanked off to give a ratio of hole area to total sieve tray area of about 6%. This ratio is lower than is customarily used in industrial practice but was made low purposely to minimize leaking or dumping at low air rates.

The active bubbling area of both trays extended beyond bubble caps and the perforated plate but there was not a sharp separation between bubbling zone and clear liquid zones. For the purpose of correlating the data, a 32 inch active length has been used.

The test unit was run over a wide range of air and water rates, up to the full capacity of the air and water pumps. The maximum liquid rate was at least 25% above normal commercial practice.

The results can be summarized by the statement that in every respect, the fluid dynamic characteristics of the bubble cap tray constructed in accordance with these specifications were equal to or better than those of the sieve tray.

As was to be expected, pressure drop through the bubble cap tray was less than through the sieve tray partly because of the latter's unusually low hole area. (This fact illustrates one of the factors discussed; i.e., higher pressure drop is a penalty for minimizing leakage.)

Liquid gradient between inlet and outlet downcomers was the same for both the sieve tray and the bubble cap tray for all weir flow rates and heights (one inch to four inches).

The distribution of air over the active tray was about the same, with possibly a slight advantage for the bubble cap tray. This conclusion is based upon observations of the average froth height and peak froth heights obtained with each tray.

Peak froth heights were somewhat higher for the sieve tray than for the cap tray, so presumably a sieve tray tower would require a greater tray spacing, than a bubble cap tower constructed in accordance with the principles of this invention. This difference, however, may be due to the somewhat lower than normal sieve tray hole area used in these tests. On the other hand, since both trays were operated over the same range of the variables and the sieve tray under no conditions performed better than the bubble cap tray one cannot attribute the difference in performance solely to hole area.

The cap tray had no leakage at all air and water rates except at the very lowest air rates used (roughly, 10% of maximum), and leakage which did occur then would not have seriously affected tower performance, whereas at these and at higher air rates the sieve tray had unacceptably high leakage, despite the relatively low hole area.

The data taken in the air-water tests have been used to derive an expression for the limiting vapor rates above which there should be no leakage through the tray assembly from one tray to the tray below.

This relationship is represented by the equation:
$G = 1635 + 508H + 0.036 W$

Wherein $G$ = air flow rate, pounds per hour per square foot of chimney area, above which leakage is substantially zero
$H$ = weir height, inches
$W$ = water flow rate, pounds per hour per inch width of stream passing over the tray.

The results of these tests are obviously different from published results comparing sieve trays with bubble cap trays. In the published comparisons, the sieve tray was always shown to be the better tray because of its higher capacity and better performance, but the comparison was usually made between the sieve tray constructed according to present knowledge and the vintage round bubble cap tray. As already stated, the round cap tray was not the best and the general conclusion that sieve trays give better performance than bubble cap trays is not warranted — as my tests show if the comparison is made with improved bubble cap tray. Thus, this invention has achieved a tray which has all of the desirable features of the sieve tray, such as low cost and good performance plus the important advantage of essentially eliminating the effect of vapor velocity through the dispersion means (i.e., sieve tray holes or bubble cap outlet slot) upon leakage.

In the case of the sieve tray, the velocity at which the vapor passes into the liquid on the tray and the pressure drop through the holes cannot be independently specified but in the bubble cap of this invention pressure drop and exit slot velocity can be independent. It is possible to size the chimney and reversal areas so as to satisfy pressure drop considerations and to size the exit slot areas to satisfy the exit velocity requirement. Other such combinations should be obvious. In the case of application to vacuum towers, this difference between sieve trays and the bubble cap tray of this invention becomes even more important.

Much more flexibility of operation is obtained. A bubble cap tray of this invention with dimensions best suited for given vapor and liquid traffic can be operated successfully at a much lower than rated capacity whereas the sieve tray is limited in this respect. For example in a crude oil distillation tower both liquid and vapor traffic varies widely between feed inlet and tower top. If sieve trays are employed in this service the hole area suitable for a number of zones would have to be determined. If a bubble cap tray of this invention were used, one set of dimensions would in most instances be satisfactory for the whole tower between feed zone and top. This difference between the two kinds of trays is an extremely important one from the point of view of both design and operation, and is a real advantage of the cap tray over the sieve tray.

Finally, some reference must be made to manufacturing and operating costs. Although, as already indicated, the trough dimensions can be varied over a wide range to optimize the tray design for different applications, it is expected that a major fraction of all applications can be satisfied by a few standard parts. Such possibilities can minimize original cost and maintenance cost as well.

What follows is an example of the application of this invention. As already stated, this invention provides considerable latitude in the dimensions of the parts for a specific tray design. Vapor and liquid traffic in this example is such that a ratio of chimney area to active area of 0.15 is required and also that the liquid seal (distance between top edge of chimney and bottom edge of cap) be 0.5 inch. All tray parts are to be constructed of one-eighth inch thick metal (thicker than usual). Although it is not necessary to have a gas passage of constant area throughout the cap assembly, as already stated such relative dimensions usually give a good design. To keep the example simple assume that the capacity of the tower and hence that the total area of a tray is large enough to make unnecessary any allowance for the effect of peripheral areas upon establishing dimensions of the tray assembly and the dimensions computed for one module will apply for the whole tray.

Use a trial chimney width of 0.75 inch and a constant area vapor passage. The other dimensions become:

| | |
|---|---|
| top of chimney to underside of cap | 0.375 inch |
| between tray and cap legs | 0.375 inch |
| between bottom of cap legs and tray floor | 0.375 inch |
| inside length of cap legs and tray legs | 0.875 inch |
| outside width of cap trough | 2.0 inches |
| center-to-center cap spacing | 5.0 inches |
| outside width of tray trough | 4.25 inches |
| distance between faces of adjacent caps | 3.0 inches |

These dimensions appear to be satisfactory but must be confirmed by other criteria, known in the art, such as allowable pressure drop, tray stability, permissible entrainment, and the like to assure good performance. Furthermore, the dimensions should be checked mechanically for such factors as allowable deflection under load for the effect of cap width and cap length upon cost.

A preferred embodiment of this invention has been described, but the invention should not be considered limited in scope to the specific details of construction illustrated and described. Details are subject to variation without departing from basic features within the scope of the claims.

I claim:

1. In a liquid-vapor contacting tower comprising a shell closed at top and bottom, inlet and outlet connections for all liquid and vapor streams into and out of the tower, a plurality of tray support means attached to the tower shell at vertically spaced levels, and a plurality of vapor-liquid contacting means, mounted on said tray support means comprising an assembly of troughs of two different widths each trough having a cross section shaped approximately like a block U, the wide ones, forming the tray floor and chimneys, being spaced from each other with the legs of the troughs pointing upward and the space between two adjacent troughs being closed at each end by a spacer piece whereby the combination of the legs of two adjacent troughs and the two end spacers form a long, low, narrow chimney including intermediate spacers where necessary to provide strength and rigidity to the assembly; and the narrow troughs, with each end closed by end pieces and with legs pointing downward to form caps which are placed over the chimneys, thereby providing a continuous vapor passage connecting the space below said assembly with the space above it, wherein the wide troughs are uniformly spaced across the diameter of the tower with their long axes parallel to each other and to the direction of the liquid stream from the tray's liquid inlet to the outlet, the improvement wherein the elements comprising said intermediate spacers include a stud bold surrounded by a spacer having a length equal to the width of the chimney at least one cap support member having a height equal to the inside height of the cap above the tray trough with a hole matching the bolt hole in the adjacent leg of the tray trough, and means to fasten together said elements.

2. In a liquid-vapor contacting tower comprising a shell closed at top and bottom, inlet and outlet connections for all liquid and vapor streams into and out of the tower, a plurality of tray support means attached to the tower shell at vertically spaced levels, and a plurality of vapor-liquid contacting means, mounted on said tray support means comprising an assembly of troughs of two different widths each trough having a cross section shaped approximately like a block U, the wide ones, forming the tray floor and chimneys, being spaced from each other with the legs of troughs pointing upward and the space between two adjacent troughs being closed at each end by a spacer piece whereby the combination of the legs of two adjacent troughs and the two end spacers form a long, low, narrow chimney including intermediate spacers where necessary to provide strength and rigidity to the assembly; and the narrow troughs, with each end closed by end pieces and with legs pointing downward to form caps which are placed over the chimneys, thereby providing a continuous vapor passage connecting the space below said assembly with the space above it, wherein the wide troughs are uniformly spaced across the diameter of the tower with their long axes parallel to each other and to the direction of the liquid stream from the tray's liquid inlet to the outlet, the improvement wherein the chimney end closures are modified U-shaped pieces the ends of which are turned outwardly 90° to form lips extending laterally outward from the legs of said U-shaped piece, the outside width of said U being equal to the distance between adjacent tray troughs, the distance between the ends of the two lateral lips being slideably equal to the inside width of the cap, the height of the U being equal to the height of the legs of the troughs plus the distance between the top of the legs of the troughs and the underside surface of the caps, and the bottom edge of said U being in the same plane as the bottoms of the tray troughs, said U-shaped closures being firmly attached to the legs of the troughs, and serving as cap end closures as well as chimney end closures.

3. The assembly of claim 2, wherein attachment of the members comprising said end closures is effected by means of a stud bolt including a spacer centered on the center of said stud bolt, said spacer having a length slideably equal to the inside width of said U-shaped spacer, cap nuts having both internal and external threads, second nuts to engage the external threads of the cap nuts, the length of said stud bolt being slideably less than the distance between the inside faces of the cap.

4. The assembly of claim 2, wherein the cap end closures are U-shaped pieces having a width equal to the inside width of the cap trough and a height equal to the inside length of the legs of the cap troughs, said U-shaped end closure being firmly attached to the legs of the cap trough at their ends.

5. In a liquid-vapor contacting tower comprising a shell closed at top and bottom, inlet and outlet connections for all liquid and vapor streams into and out of the tower, a plurality of tray support means attached to the tower shell at vertically spaced levels, and a plurality of vapor-liquid contacting means, mounted on said tray support means comprising an assembly of troughs of two different widths each trough having a cross section shaped approximately like a block U, the wide ones, forming the tray floor and chimneys, being spaced from each other with the legs of the troughs pointing upward and the space between two adjacent troughs being closed at each end by a spacer piece whereby the combination of the legs of two adjacent troughs and the two end spacers form a long, low, narrow chimney including intermediate spacers where necessary to provide strength and rigidity to the assembly; and the narrow troughs, with each end closed by end pieces and with legs pointing downward to form caps which are placed over the chimneys, thereby providing a continuous vapor passage connecting the space below said assembly with the space above it, wherein the wide troughs are uniformly spaced across the diameter of the tower with their long axes parallel to each other and to the direction of the liquid stream from the tray's liquid inlet to the outlet, the improvement wherein the vapor outlet is a long, narrow slot formed by the bottom edge of the cap trough and the floor of the tray.

* * * * *